R. S. HARDIE.
NUT LOCK.
APPLICATION FILED MAY 27, 1921.
1,431,459. Patented Oct. 10, 1922.
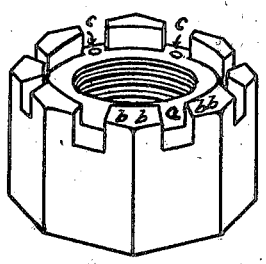
Fig. 1.
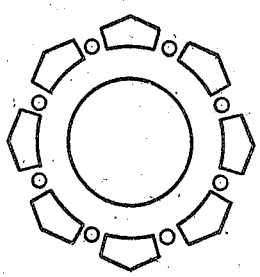
Fig. 3.
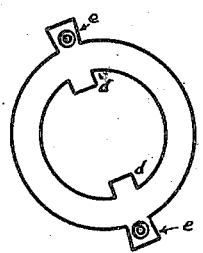
Fig. 4.
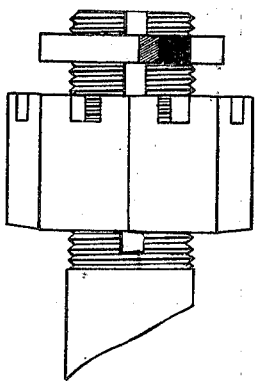
Fig. 7.
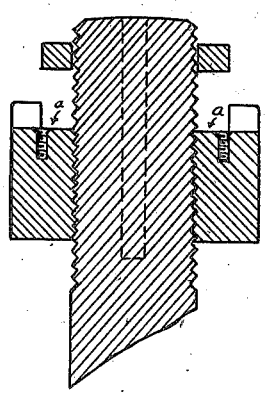
Fig. 8.
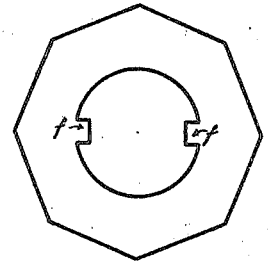
Fig. 2.
Fig. 6.
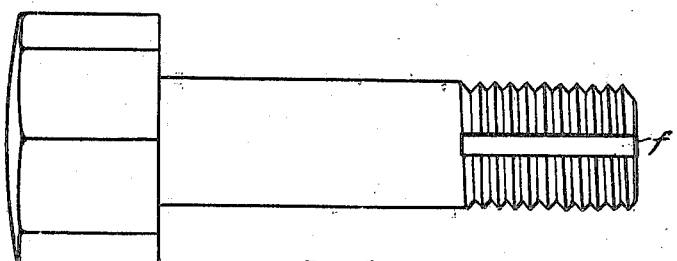
Fig. 5.
Robert Scott Hardie
INVENTOR
WITNESS Patented Oct. 10, 1922.

1,431,459

UNITED STATES PATENT OFFICE.

ROBERT SCOTT HARDIE, OF CALGARY, ALBERTA, CANADA.

NUT LOCK.

Application filed May 27, 1921. Serial No. 473,042.

*To all whom it may concern:*

Be it known that I, ROBERT SCOTT HARDIE, a subject of the British Empire, residing in the city of Calgary, in the Province of Alberta, Canada, have invented a new and useful Nut Lock, of which the following is a specification.

My invention relates to an improvement in a nut lock and the object of my improvement is to provide a device that will hold a nut rigidly upon a bolt where it has been placed and that will absolutely prevent it from either tightening or loosening on the said bolt as long as it may be required to remain in its said place.

I attain these objects by the mechanism illustrated in the accompanying drawings in which—

Figure 1 shows the form of nut used having a depressed centre ($a$) on its upper surface also castellations ($bb$) and screw holes ($cc$) for receiving the screw (Figure 2) by which the lock is fastened to the said nut.

Figure 2 is a side view of the screw.

Figure 3 is a cross-section of the upper surface of the said nut.

Figure 4 is the lock having projections ($dd$) and ($ee$) on its inner and outer circumferences respectively and holes in the latter through which the screws (Figure 2) pass in securing the lock to the nut.

Figure 5 shows the bolt with a groove ($f$) cut longitudinally into the thread thereof. There is a similar groove on the opposite side of the said bolt as shown in the end elevation thereof in Figure 6.

Figure 6 is an end elevation of the bolt.

Figure 7 shows the threaded end of the said bolt with a nut partly screwed thereon and the said lock being applied to the said nut for the purpose of locking the same.

Figure 8 shows the said depressed centre ($a$) of the said nut which is the seat of the said lock.

The nut is locked in the following manner namely,—

The lock (Figure 4) is made of metal and shaped according to the form shown in the drawings. The inner projections thereon ($dd$) are adapted to fit into the grooves ($ff$) of the said bolt; the outer projections thereon ($ee$) are adapted to fit in between the said castellations ($bb$) of the said nut.

When the nut has been screwed into place the lock, of a size to fit the bolt and nut, is placed down over the end of the bolt with the projections ($dd$) following down in the grooves ($ff$) and the projections ($ee$) then enter in between the corresponding castellations in the upper side of the nut and are then securely screwed to the same as described above. When this is done the nut can neither tighten nor loosen; it is rigidly locked.

What I claim as my invention and desire to secure by Letters Patent is—

In a nut lock a bolt having longitudinal grooves on opposite sides of its threaded end, a nut having a depressed center and castellations on the outer edge of its upper surface, a concentric metal plate fitted to the said bolt and nut, having projections in its inner and outer circumferences which are adapted to engage with the said grooves and castellations, the said metal plate being fastened to the said nut within the said depressed centre by means of screws, all working in combination to form a nut lock substantially as set forth.

ROBERT SCOTT HARDIE.